United States Patent
Okamoto et al.

(10) Patent No.: US 7,447,169 B2
(45) Date of Patent: *Nov. 4, 2008

(54) RADIO COMMUNICATION SYSTEM

(75) Inventors: Naoki Okamoto, Chiba (JP); Norihiko Morinaga, Osaka (JP); Seiichi Sanpei, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 181 days.

This patent is subject to a terminal disclaimer.

(21) Appl. No.: 10/507,068

(22) PCT Filed: Feb. 18, 2003

(86) PCT No.: PCT/JP03/01719

§ 371 (c)(1),
(2), (4) Date: Apr. 4, 2005

(87) PCT Pub. No.: WO03/077578

PCT Pub. Date: Sep. 18, 2003

(65) Prior Publication Data

US 2005/0181814 A1  Aug. 18, 2005

(30) Foreign Application Priority Data

Mar. 11, 2002  (JP) .............................. 2002-064925

(51) Int. Cl.
*H04B 7/00* (2006.01)
*H04B 7/212* (2006.01)

(52) U.S. Cl. ................. 370/310; 370/337; 370/347; 370/442; 455/69; 455/450; 455/508

(58) Field of Classification Search ............. 455/69, 455/522, 101, 509, 67.11, 67.13, 450–452.2; 370/347–348, 337

See application file for complete search history.

(56) References Cited

U.S. PATENT DOCUMENTS

| 6,545,997 | B1 | 4/2003 | Bohnke et al. | |
|---|---|---|---|---|
| 6,836,484 | B2 * | 12/2004 | Suzuki | 370/465 |
| 6,947,748 | B2 * | 9/2005 | Li et al. | 455/450 |
| 2001/0024427 | A1 | 9/2001 | Suzuki | |
| 2004/0109419 | A1 * | 6/2004 | Sano et al. | 370/320 |
| 2006/0126493 | A1 * | 6/2006 | Hashem et al. | 370/208 |

FOREIGN PATENT DOCUMENTS

| CN | 1234661 A | 11/1999 |
|---|---|---|
| JP | 5-259981 A | 10/1993 |
| JP | 2001-238269 A | 8/2001 |
| JP | 2002-335557 A | 11/2002 |

OTHER PUBLICATIONS

Toshiyuki Nakanishi et al., 2002 nen The Institute of Electronics, Information and Communication Engineers Sogo Taikai, 02-HaruTsushin1-B-5-163, Mar. 7, 2002, p. 614.

Hidemi Matsumura et al., The Institute of Electronics, Information and Communication Engineers, pp. 107 to 112.

* cited by examiner

*Primary Examiner*—Simon D Nguyen
(74) *Attorney, Agent, or Firm*—Birch, Stewart, Kolasch & Birch, LLP (57) ABSTRACT

A TDMA radio communication system using a multiple subcarrier modulation method and comprising at least a first and a second radio station. The first radio station carries out communications by selectively modulating a subcarrier with which a desired transmission rate can be obtained in the second radio station, thereby providing a radio communication system that does not require the monitoring of each time slot by a terminal.

5 Claims, 12 Drawing Sheets

FIG. 5 (a) DESIRED WAVE SPECTRUM

FIG. 5 (b) INTERFERENCE WAVE SPECTRUM

FIG. 5 (c) DESIRED WAVE + INTERFERENCE WAVE SPECTRUM

FDMA METHOD

FIG. 10 (b)

TDMA METHOD

RADIO COMMUNICATION SYSTEM

FIELD OF THE INVENTION

The present invention relates to digital radio communication systems and more particularly to a method of enabling a fast and stable communication to be carried out in a cellular system with planar or horizontal service areas in which cells are constructed using the same frequency.

BACKGROUND ART

In radio systems, such as one for cellular phones, for example, radio services must cover communication areas in a planar fashion. Further, the range of radio transmission is limited and all of the service areas cannot be covered by a single base station ("access point"; to be hereafter referred to as "access point AP"). Accordingly, a plurality of access points AP are provided so that communications can continue despite the movement of terminal stations.

Figure 9:
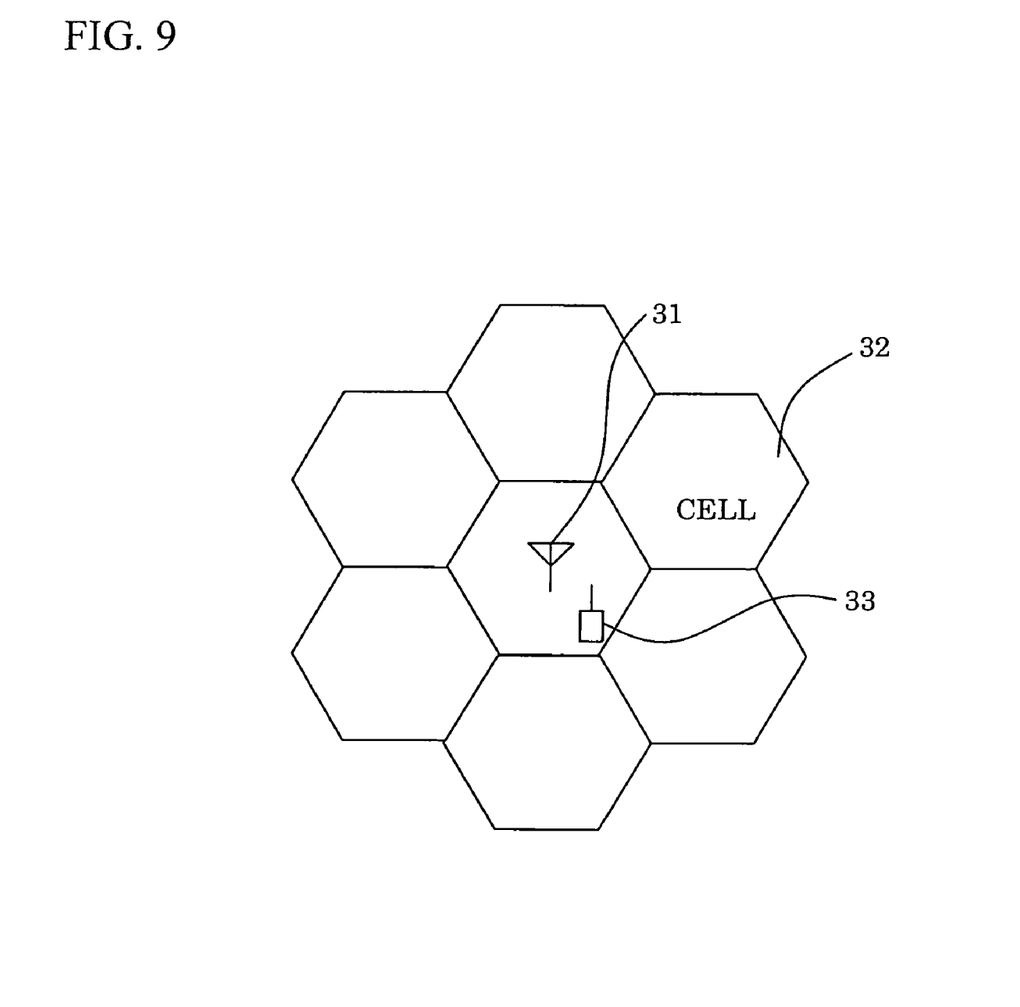
FIG. 9 shows the concept of a conventional cellular system.

Specifically, a system called "cell configuration" is employed, as shown in FIG. 9. Referring to FIG. 9, each hexagon represents a cell 32 at the center of which an access point AP 31 is located. In each cell 32, a terminal MT 33 is controlled by the access point AP 31 and communications are carried out between the access point AP 3 and the terminal MT 33.

In this configuration, in order to allow services, such as telephone services, to continue when the terminal MT moves, the individual cells 32 must be arranged at least in an adjoining manner or in such a manner that they have partly overlapping areas therebetween. However, the adjoining cells must communicate among themselves at different frequencies so as to avoid their radio waves from entering each other and interfering with each other. When communications are carried out at the same frequency, if the communicating cells are apart from each other with a distance corresponding to several cells, for example, the intensity of the interfering waves are sufficiently reduced that no problems are caused. This type of system is used in PDC (Personal Digital Cellular), for example, which is a current cellular phone system.

However, since in this type of system the frequencies that can be actually used in a single cell are only a fraction of the frequencies that are allocated to the entire system, the volume of lines that can be accommodated in a single cell is limited.

Figure 10:
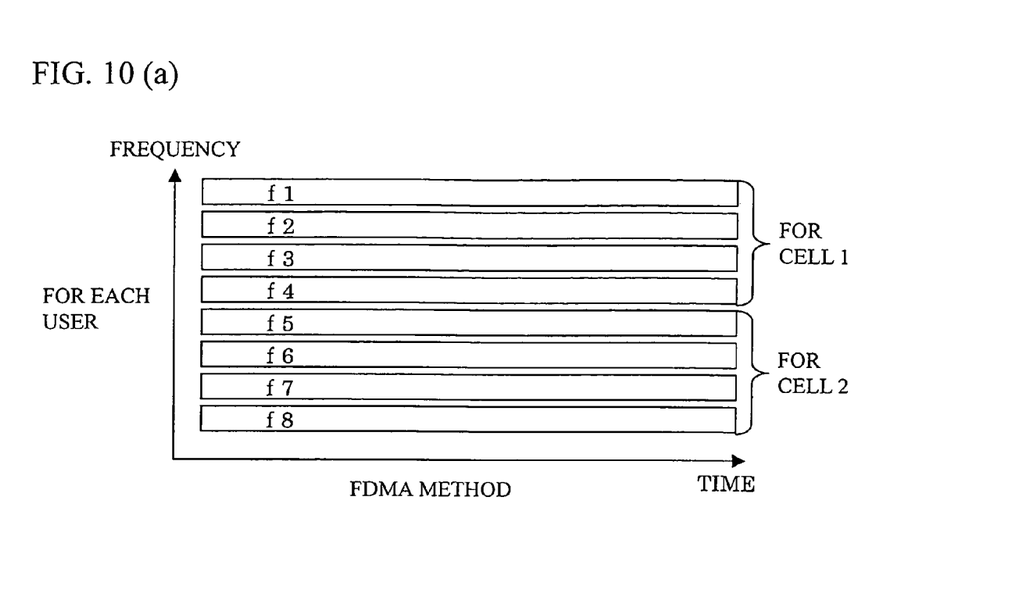
FIG. 10 shows the difference between FDMA and TDMA in terms of the manner of use, with FIG. 10(a) showing a state of user occupation on a time-frequency axis in a FDMA method, and FIG. 10(b) showing a state of user occupation on a time-frequency axis in a TDMA method.

There has been a proposal to configure cells at the same frequency using TDMA (Time Division Multiple Access) technology. With reference to FIG. 10, the method of utilizing frequency and time in this technology will be described. FIG. 10(a) shows the relationship between time and frequency in the FDMA (Frequency Division Multiple Access) method. FIG. 10(b) shows the relationship between time and frequency in the TDMA method.

As shown in FIG. 10(a), in the FDMA method, each user is allocated a different frequency, so that the same frequency is occupied by a particular user on the time axis during communication. Further, since there are a plurality of users in each single cell, a plurality of frequency channels are allocated to each cell. For example, there are users in cell 1 that conduct communications using frequencies f1 to f4. In cell 2, there are users who communicate using frequencies f5 to f8.

As shown in FIG. 10(b), the TDMA method employs one frequency (band) that is divided into small slots on the time axis, and the users conduct communications using their assigned slots. When carrying out communications, a slot must be allocated to each user repeatedly. For this purpose, a control is performed whereby, for example, a user is allocated in each period where a repetition period is taken as one cycle.

Figure 11:
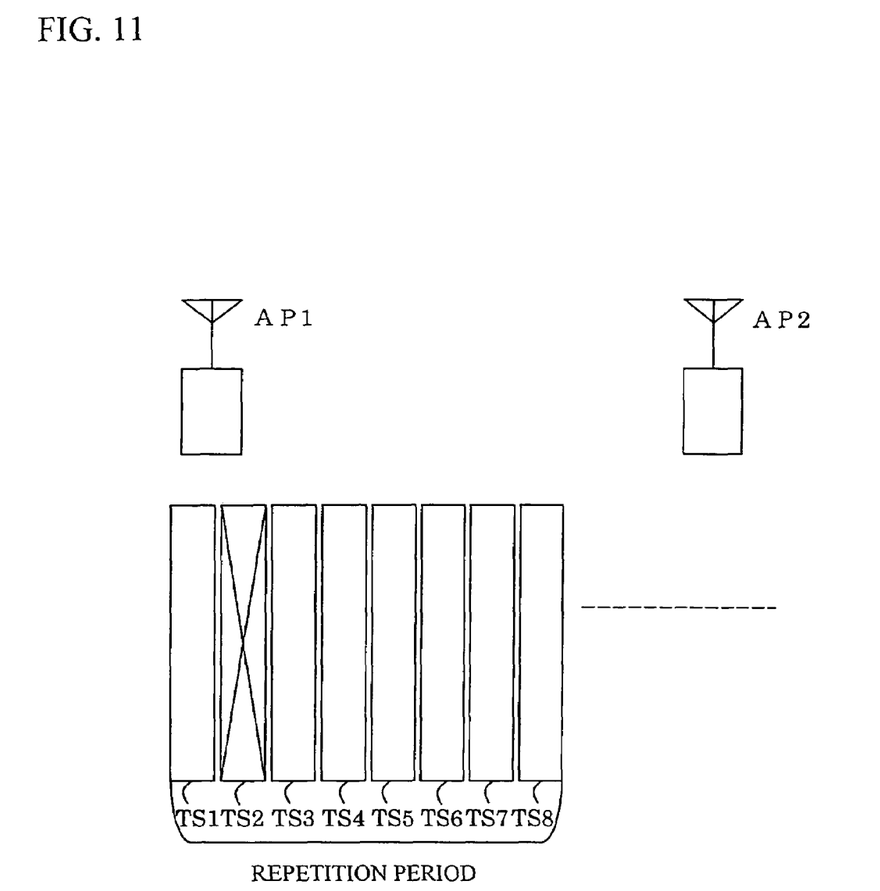
FIG. 11 shows the way in which time slots are used in a TDMA system.

With reference to FIG. 11, the method of using time slots in a case where a second access point AP2 exists in a cell adjacent to a first access point AP1.

It is now assumed that the two access points AP1 and AP2 operate as communication systems of the TDMA method and that they have the same number of time slots (repetition periods) and the same time slot times that are synchronized between the first and second access points AP1 and AP2. The system shown in FIG. 11 have eight time slots TS1 to TS8, for example.

As shown in FIG. 11, the first access point AP1 and a terminal (not shown) communicate with each other using a second time slot TS2. In this case, therefore, the time slots TS1 and TS3 to TS8 are vacant.

The use of the second time slot TS2 for communications between the second access point AP2 and the terminal would result in a large radio interference due to the communications going on between the first access point AP1 and the terminal. Therefore, the communications between the second access point AP2 and the terminal are carried out using a time slot selected from the remaining seven time slots other than the second time slot TS2.

By thus using the same frequency and dividing the time domain into a plurality of time slots, the frequency can be shared by different access points AP for communications among one another.

In the conventional frequency division method, it is difficult to freely change the frequency width due to the limitations of analog circuits, such as filters. On the other hand, there are no circuitry limitations in the TDMA method since this method divides on the time axis. It is also possible for a single terminal to use not just one time slot but two or three time slots. In this way, the communication volume can be increased by two or three folds, allowing bands to be freely controlled in multimedia communications, for example.

Thus, the TDMA method is also advantageous for communications in which the transmission volume varies constantly, such as packet data communications.

In a communication system based on the TDMA method in which the cell configuration is adopted as described above, the vacancy state of time slots as minimum units has a large influence on the number of terminals that can be accommodated. In the case where cells are assembled at the same frequency, the number of terminals that can be accommodated in each cell is determined by the number of time slots, the interference distance, and the cell arrangement.

In radio communications, the received power (C) versus noise power (N) ratio (C/N), or the received power (C) versus interference power (I) ratio (C/I) that are required for communications are determined by the performance of the system or the terminals. If these conditions are not met, problems arise in communications. The expression (C/(N+I)), in which both of the above-mentioned influences are taken into consideration, might also be used as the indication of whether or not communications are possible.

Referring to FIG. 11, a time slot that can be used in a predetermined time slot TS is that slot on which the influence of interference due to other radio stations is not more than the above expression C/(N+I). For example, a time slot in which an interference power exceeding an allowable power exists cannot be additionally allocated to an access point AP.

Consequently, a terminal that tries to connect to an access point AP has to measure the received power or the C/(N+I) ratio of every time slot and then notify the access point AP of the obtained information so that the access point AP can then allocate to the terminal a time slot that has no influence of interference and that is a vacant slot in the relevant cell.

Further, when a packet communication is carried out in a TDMA system, a particular terminal does not occupy a time slot constantly, but rather vacant slots change all the time. Therefore, the terminal must monitor the occupation state of every time slot continuously. This means that the terminal is in a receiving state all the time, resulting in increasing power consumption and other problems.

Moreover, as the number of terminals increases and the influence of the radio waves used by adjacent cells increases, there could even be cases where none of the time slots are available, putting a particular terminal in a busy state. In such cases, communications with the particular terminal cannot be conducted until its communication with another terminal ends, the interfering station ends communications, or the radio environment changes as the station attempting connection caused by movement of the station, for example.

There is another problem relating to handoff. When a communicating terminal moves across cells in a service area divided into cells, the access points AP with which the terminal communicates are switched in an operation ("handoff").

There are two types of handoff. One is called a hard handoff whereby the connection of a line between the terminal and an access point AP toward which the terminal is approaching is established after the connection of a line with the access point AP from which the terminal is moving is cut. The other is called a soft handoff whereby the connection of a line between the terminal MT and an approaching access point AP is established before disconnecting the connection of a line with the original access point AP, such that the weight of connection is gradually shifted from that with the original access point AP to the approaching access point AP.

Since the TDMA method employs the same frequency for communications, the method characteristically realizes a soft handoff procedure that allows the terminal MT to communicate with the original and approaching access points AP simultaneously.

In the case of soft handoff, if the time slot that has been used by the original access point AP is vacant in the approaching access point AP, the same time slot is allocated for soft handoff. The terminal MT is thus allowed to carry out communications with the two access points AP at the same frequency and in the same time slot by emitting only one type of radio wave, thus realizing the soft handoff on the part of the system.

Figure 12:
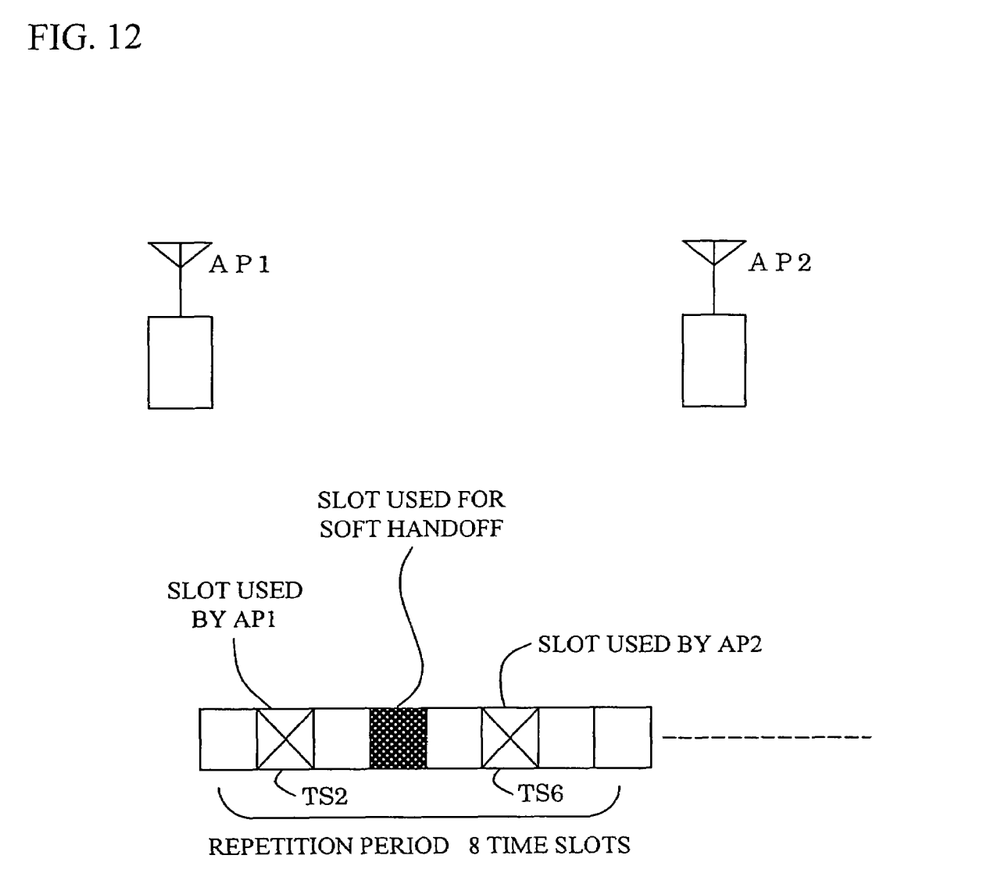
FIG. 12 is a conceptual diagram showing a state of use of time slots in a soft handoff process in a TDMA system.

FIG. 12 shows the manner in which the time slots are utilized in the above-described case. It is assumed that the two access points AP1 and AP2 are operated as TDMA radio communication systems and that they have the same number of time slots (repetition periods) and the same time slot times that are synchronized. The system shown in FIG. 12 involves eight time slots, for example.

A first access point AP1 is communicating with a first terminal that exists in a cell of its own station, using a second time slot TS2. A second access point AP2 is communicating with a second terminal in a cell of its own station which is different from the first terminal, using a sixth time slot TS6.

It is now assumed that a soft handoff procedure is to be performed and that a third terminal, which is about to initiate soft handoff, is communicating using a fourth time slot. In this example, the soft handoff procedure can be performed because the second access point AP2 is not using the fourth time slot TS4.

However, if a third access point AP (not shown) that is located adjacent to or has a strong influence on the second access point AP2 is using the fourth time slot TS4 such that, even though the second access point AP2 is not using the fourth time slot TS4, there is a strong interference, the second access point AP2 may in some cases not be able to use the fourth time slot TS4 for communications. In such cases, the soft handoff procedure cannot be performed.

As explained above, while the TDMA system has the advantage of soft handoff, as the density of terminals increases, it becomes increasingly difficult to select a vacant time slot that is common to the two access points AP1 and AP2 and that has a reduced interference.

It is therefore an object of the invention to provide a radio communication system that does not require the monitoring of each time slot by the terminals. It is another object of the invention to provide a technology that can eliminate situations where a terminal cannot conduct communications because none of the time slots are available or situations where soft handoff cannot be performed.

DISCLOSURE OF THE INVENTION

In one aspect, the invention provides a TDMA radio communication system that uses a multiple subcarrier modulation method and that comprises at least a first and a second radio station, wherein said first radio station carries out communications by selectively modulating a subcarrier with which a desired transmission rate can be obtained in said second radio station.

The first radio station (a base station, for example) can arbitrarily allocate a time-divided time slot used for communication with the second radio station (a terminal station, for example) to a second radio station under the control of the first radio station.

In the above TDMA radio communication system, the second radio station preferably comprises: a power detection means for detecting the received power for each subcarrier and detecting the interference power from a radio station different from the first radio station with which said second radio station is communicating; and a notification means for notifying said first radio station of information regarding said received power and said interference power detected by said detection means, and wherein said first radio station comprises: a subcarrier selection means for selecting, based on a reception state and an interference state of each subcarrier that have been returned from said second radio station, a subcarrier with which a desired transmission rate can be achieved in said second radio station; and a switch means for turning on and off of modulation on a subcarrier basis.

In accordance with the invention, in a radio communication system using a multiple carrier (multiple subcarrier) modulation method and based on a cellular system in which a cell configuration is employed such that each cell carries out connections in the TDMA method using the same frequency, a terminal station detects the received power for each subcarrier and the interference power for each subcarrier from other base stations other than the base station with which the terminal is communicating, and then notifies the base station. The base station, based on a reception state and an interference state for each subcarrier that have been returned from the terminal station, then selects a subcarrier with which a desired transmission rate can be achieved in the terminal station, and then carries out communication.

As a result, the base station can arbitrarily allocate time slots to terminal stations under the control of the base station without considering the interference with other cells.

The interference power detection means may comprise the base station grouped with other base stations that can give interference in its own cell area, where the base stations transmit a notification signal one by one successively and periodically in a cyclic manner. The terminal station then calculates and stores the interference power state for each subcarrier of each base station, so that a ratio of the desired wave power to the interference power can be calculated for each subcarrier.

In another embodiment, the interference power detection means may comprise the base station grouped with other base stations that can give interference in its own cell area, wherein each base station comprises a means of transmitting a notification signal at the same time. The base stations terminate the transmission one by one successively and periodically in a cyclic manner, so that the terminal station can measure the interference power of the other base stations other than the base station with which the terminal is communicating and then calculate a ratio of the desired wave power to the interference power.

In a soft handoff procedure, the terminal station may categorize the received power from the base stations A and B and the interfering power from other stations into the following conditions on a subcarrier basis, so that more accurate handoff condition standards can be created.

Condition 1: C/(N+I) of base station A is larger than C/(N+I) of base station B.

Condition 2: C/(N+I) of base station B is larger than C/(N+I) of base station A.

Condition 3: C/(N+I) is equal for both base stations A and B.

If (the number of subcarriers with Conditions 1+3>the number of subcarriers with Condition 2), then the handoff control is mainly carried out by base station A.

If (the number of subcarriers with Conditions 2+3>the number of subcarriers with Condition 1), then the handoff control is mainly carried out by base station B. In this way, a more accurate handoff procedure can be performed.

DESCRIPTION OF THE PREFERRED EMBODIMENTS

Before going into the details of the embodiments of the invention, the inventors' analysis is described.

It had occurred to the inventors that by using the OFDM (Orthogonal Frequency Division Multiplex) method for modulation in a radio communication system based on the TDMA multiplication method, it might be possible to allow radio communications to continue without interruption even if the time slot used for radio communications between an access point (a first radio station) and a terminal (a second radio station) is the same as the time slot used for radio communications between radio stations that are adjacent to the first and second radio stations.

This will be described in greater detail with reference to FIGS. 5(a) to 5(c).

Figure 5:
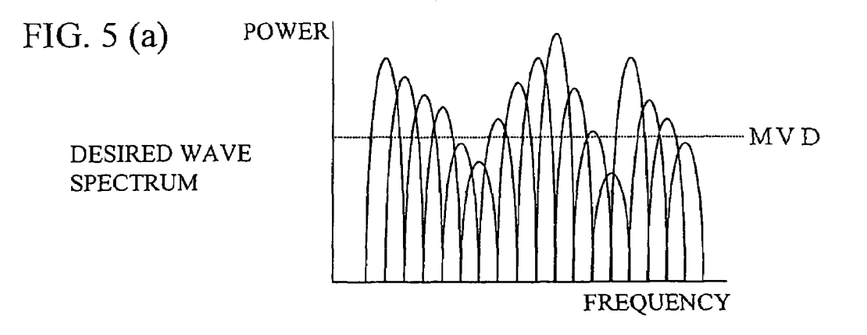
FIG. 5 shows an example of the configuration of a broadcast time slot in a radio communication system according to a first embodiment of the invention, with FIG. 5(a) showing the power spectrum of a desired wave and FIG. 5(b) showing the power spectrum of an interfering wave, and FIG. 5(c) showing the power spectrum upon reception of the power spectra of a desired wave and an interference wave simultaneously.

FIG. 5(a) shows a graph of the spectrum of a desired wave (a signal that is actually used for radio communications), in which the ordinate shows electric power and the abscissa shows frequency. When this spectrum as a whole is considered a composed desired wave, the spectrum indicates a mean power value that is defined by the dotted line MVD and independent of frequency.

FIG. 5(b) shows a graph of the spectrum of an interference wave (a signal that enters due to other radio communications). If this spectrum as a whole is considered a composed interference wave, the spectrum indicates a mean power value that is defined by the dotted line MVI and independent of frequency.

If there is no difference in electric power values between the composed desired wave of FIG. 5(a) and the composed interference wave of FIG. 5(b) (such as when two radio communicating objects approach each other), there would be no difference in electric power values at any frequency between the composed desired wave and the composed interference wave, so that it would be impossible to perform communications using the same time slot.

In reality, however, as shown in FIG. 5(a), the spectrum of the desired wave modulated by the OFDM method can be expressed as a composed wave of a number of subcarriers. Each of the subcarriers has temporal variations in accordance with the Rayleigh distribution due to the influence of fading. Namely, the electric power values vary temporally.

The inventors thought of the spectrum of the desired wave and the interference wave (the relationship between power and frequency) at a given time as shown in FIG. 5(c). As shown, when looked at in subcarrier units and at a given time, it can be thought that there are frequency bands (fb1 and fb2 in the example of FIG. 5(c)) in which the power of the desired wave greatly exceeds the power intensity of the interference wave (i.e., the interference wave can be disregarded). In other words, in the frequency bands fb1 and fb2, the influence of the interference wave can be disregarded even when the same time slot is used, so that there is the possibility that different transmission and reception processes can be performed in the same time slot in communications between radio stations.

The inventors further came up with the idea of providing a means for detecting the frequency bands fb1 and fb2 shown in FIG. 5(c) so that, by performing the transmission and reception processes using only these frequency bands (subcarriers), different transmission and reception processes can be reliably performed in the same time slot.

Based on the above discussion, embodiments of the invention will be described in the following.

A radio communication system according to a first embodiment of the invention will be described by referring to the drawings.

A case will be described in which terminals exist in a cell in which an access point is present. The terminals are connected as communication systems to the network by conducting communications with the access point. For this purpose, a time slot must be determined in which the communications with the access point are conducted.

In accordance with the invention, a time slot among all of the time slots provided for the access point by the system that is not allocated to any other terminals in the station can be freely allocated for communications with a particular terminal.

The access point periodically transmits, for example, a detection signal that is used by the terminals in measuring the intensity of a signal from the access point and comparing it with the intensity of an interference signal.

The detection signal must be transmitted by all of the access points. Thus, the access point AP1 emits the detection signal at a frequency that depends on the number of access points AP in a group that includes the cells of the access point AP1 and in which interference is thought to affect those cells.

Figure 1:
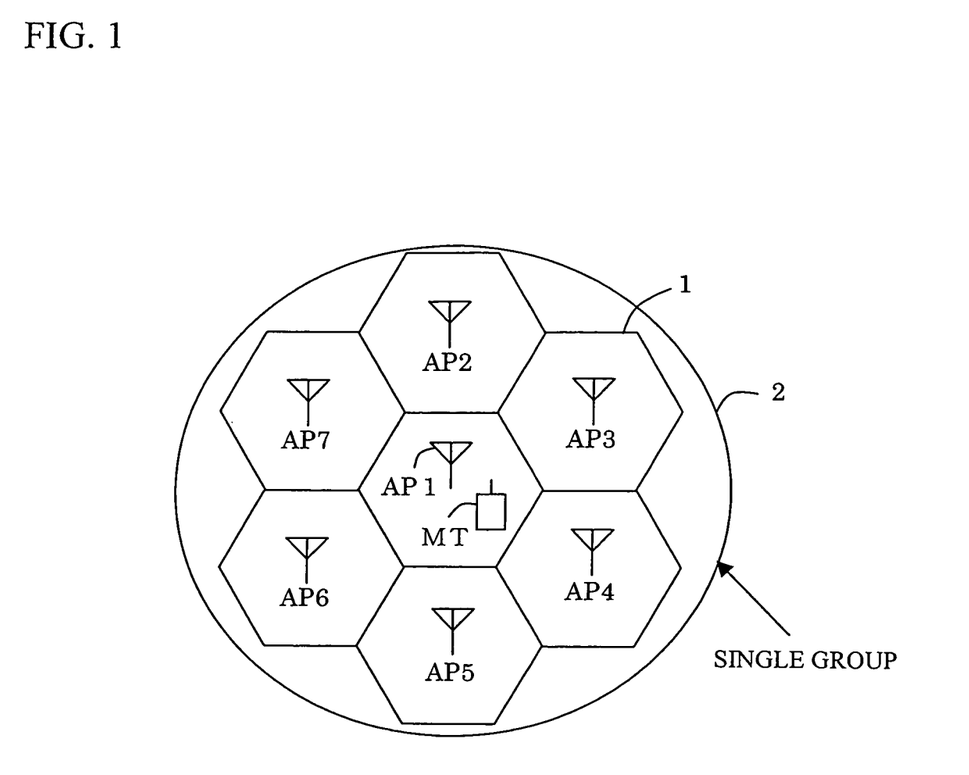
FIG. 1 is a conceptual diagram showing a model of grouping in a cellular system.

FIG. 1 shows a conceptual chart of the radio communication system according to the present embodiment.

As shown in FIG. 1, the radio communication system of the embodiment includes a single cell group 2 containing seven hexagonal cells 1.

The cell group 2 has a cell configuration such that the cell in which a first access point AP1 exists has each of its six sides in contact with a side of each of the other six, surrounding cells. In the other six cells, there are located second to seventh access points AP2 to AP7, one access point for each cell.

In the radio communication system shown in FIG. 1, presumably the cell in which the access point AP1 exists is influenced by an interference signal from the six other access points, so that these seven stations comprise a single group. In this case, the seven stations successively transmit a detection signal.

Thus, a detection signal is transmitted from the access point AP1 once every seven times.

Figure 2:
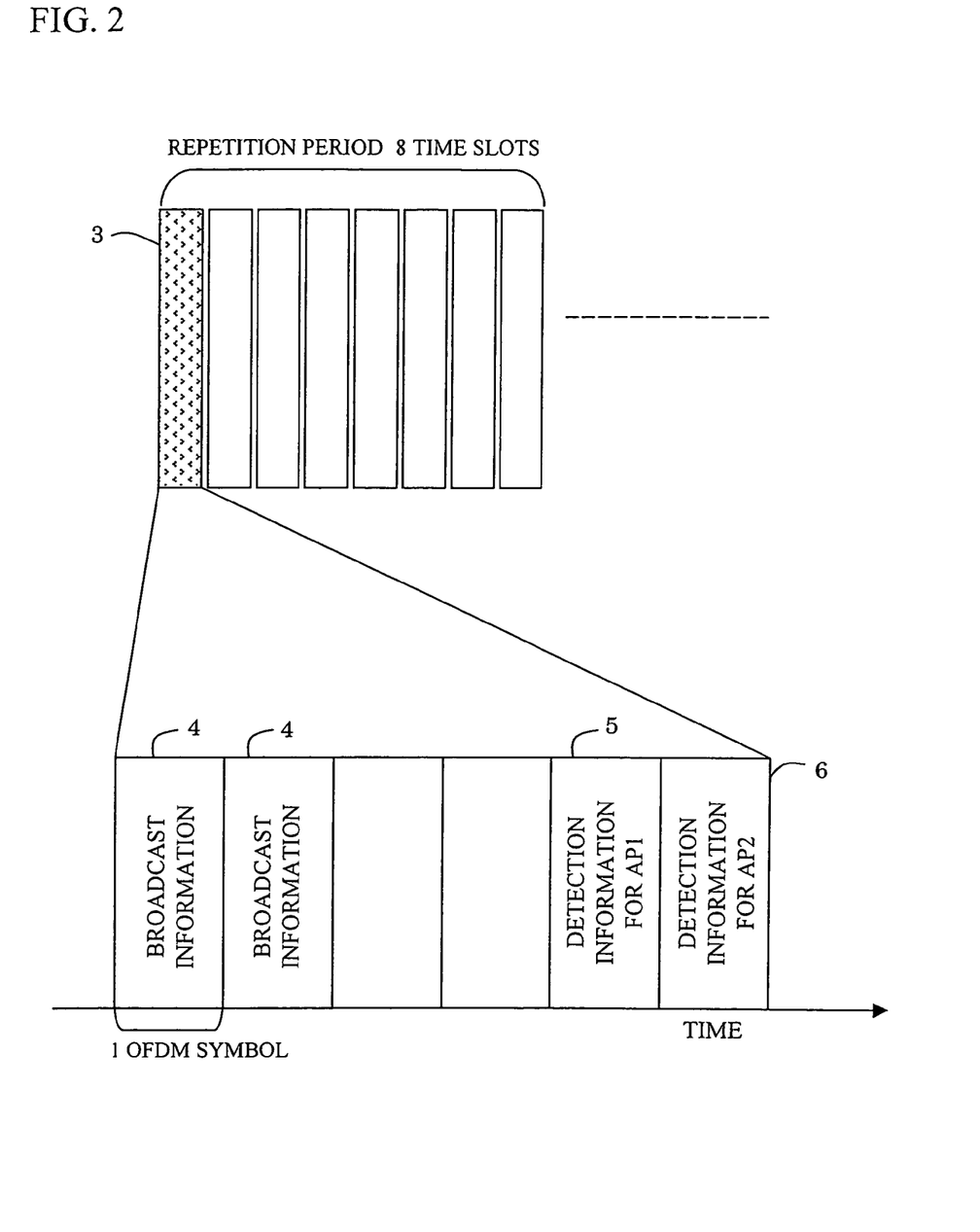
FIG. 2 shows an example of the configuration of a broadcast time slot in a radio communication system according to a first embodiment of the invention.

FIG. 2 shows an example of the structure of a detection packet. As shown, in a repetition period of time slots, a detection signal segment is provided in at least one time slot for use by grouped base stations. In the illustrated example, detection information is located in a time slot 3 for broadcast. The time slot in the radio communication system based on the TDMA method is made of a plurality of OFDM symbols in which broadcast data is allocated in the first half and detection signals 5 and 6 (including information indicating a signal is to be acquired from either access point AP1 or AP2) allocated for each access point AP are allocated in the latter half. In order to measure a signal on a subcarrier basis, at least one OFDM signal must be occupied by a single access point AP.

In the illustrated example, as the access points AP transmit successively two access points at a time in each repetition, the access points make a round after every 3.5 transmissions. Alternatively, the access points may be adapted to transmit one access point at a time, such that the repetition period consists of seven transmissions. This is dependent on the time that can be used for detection information which is determined by the number of the grouped access points AP, the length of one time slot, and the length of broadcast data, for example. Thus, each access point AP can transmit its own detection packet periodically.

Figure 3:
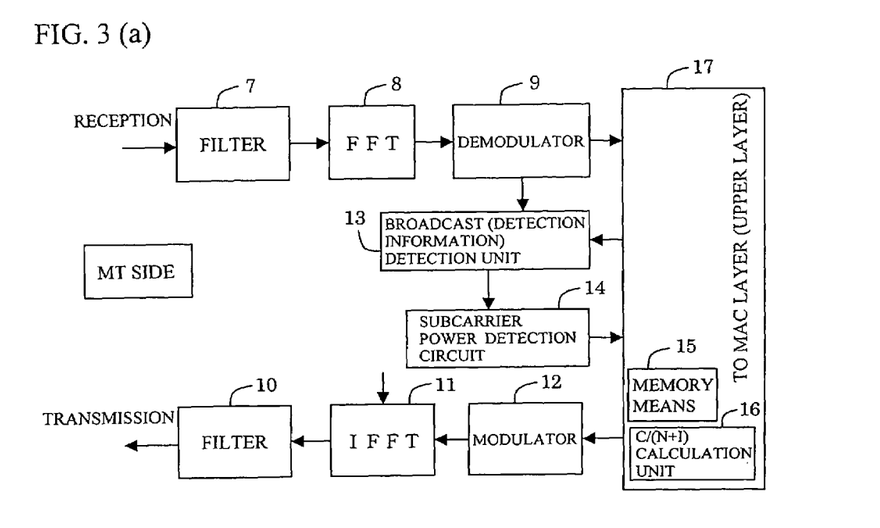
FIG. 3 shows radio stations used in the radio communication system according to the first embodiment of the invention, with FIG. 3(a) showing a functional block diagram of a terminal station, and FIG. 3(b) showing a functional block diagram of an access point.

Upon reception of the transmitted signal, a terminal measures the intensity of the notification signal on a subcarrier basis. An example of a configuration is shown in FIG. 3.

FIG. 3(a) shows a functional block diagram of an example of the radio terminal (MT) according to the present embodiment. FIG. 3(b) shows a functional block diagram of an example of the access point AP according to the present embodiment.

As shown in FIG. 3(a), a reception operation is carried out as the received signal is passed through an antenna, a frequency converter, a filter 7, an FFT 8, and a demodulator 9. In a broadcast detection unit 13, the broadcast time slot is detected and detection information is extracted therefrom. Then, the power of each subcarrier is measured in a subcarrier power detection circuit 14. These items of information are then stored in a memory means 15 provided in a MAC layer (upper layer) 17 for each of the seven access points AP.

Then, the terminal station MT determines in a C/(N+I) calculation unit 16 the interference ratio to the access point AP1 on a subcarrier basis, namely C/(N+I). (N+I) is the undesired wave (interference wave) power, which is the sum of thermal noise and the interference from access point AP2 to access point AP7.

The value (detection information) obtained by the C/(N+I) calculation unit 16 is then transmitted via a modulator 12, an IFFT (inverse Fourier transform) circuit 11, and a filter 10.

In the present embodiment, the calculation of C/(N+I) is performed on the terminal (MT) end. Alternatively, however, the calculation may be performed on the access point AP1 end that has received individual measurement result via a transmission means. Based on the result, the base station selects a subcarrier that can be used for communications and then conduct communications.

As shown in FIG. 3(b), on the access point (AP) end, the signal transmitted from the terminal MT is sent via a filter 18, an FFT 19 and a demodulator 20 to a determination circuit 25 in a MAC layer 26, where, based on the detection information, it is determined which subcarrier can be used for communications and only a subcarrier that can be used for communications is selected. This determination is made on the basis of the value of C/(N+I) determined by the performance of the terminal device and the system to which a system margin has been added.

In response to the result of determination in the determination circuit 25, a transmission subcarrier selection circuit 24 selects a subcarrier that is transmitted. In addition, the determination circuit 25 notifies the upper layer of the number of information bits that can be transmitted in a single time slot. This is due to the fact that the overall required transmission time varies depending on the number of bits that can be transmitted, thus requiring a control in the upper layer.

It is also necessary to place a signal in the control signal portion instead of the information signal portion in order to notify the terminal MT of which subcarrier carries a signal.

A configuration for this purpose is described below with reference to FIG. 4.

Figure 4:
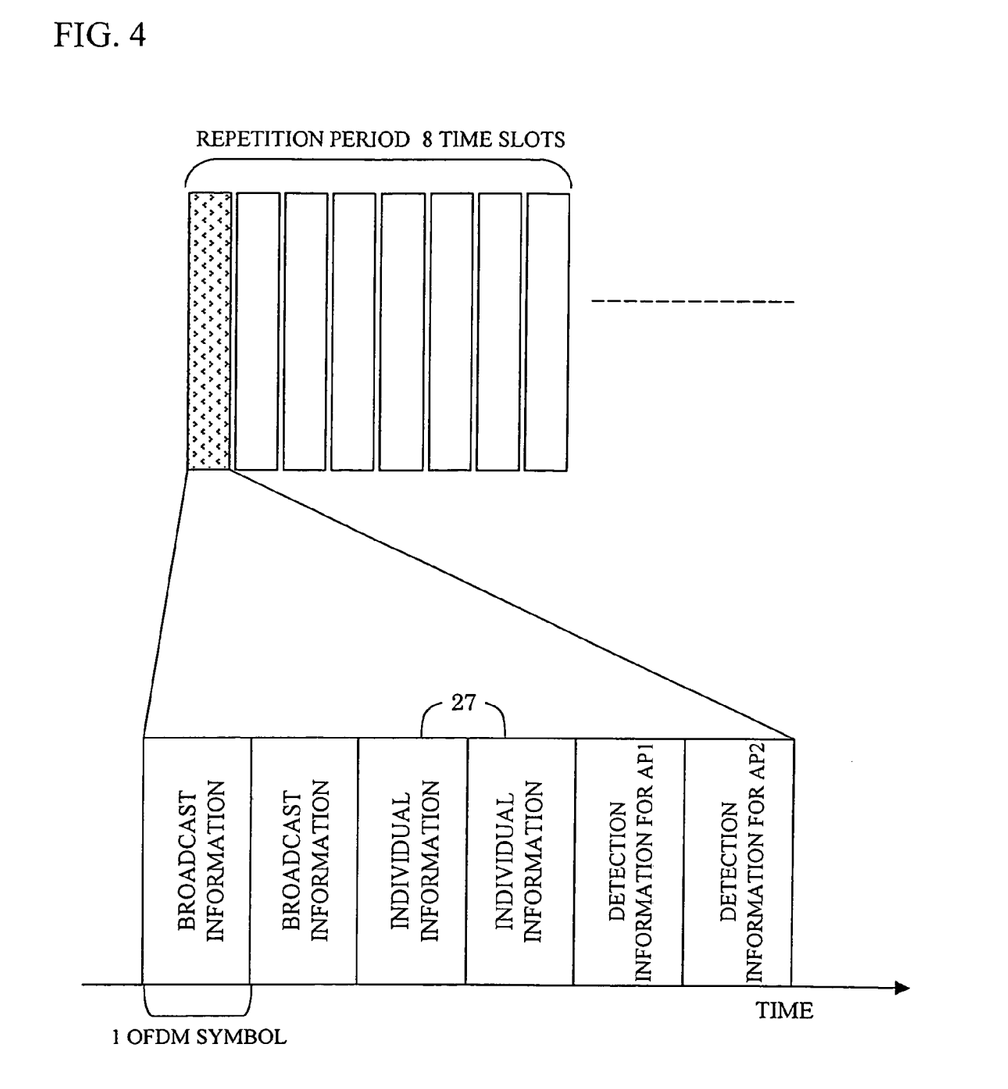
FIG. 4 shows an example of the configuration of a broadcast time slot in a radio communication system according to a first embodiment of the invention.

As shown in FIG. 4, a broadcast packet including individual information 27 and detection information for access point AP1 and AP2 (information notifying that access point AP1 does not issue transmission information) is transferred to the terminal MT. Based on this signal, the terminal MT determines a subcarrier to be demodulated.

While in the above-described example the subcarrier that is transmitted is selected on the access point AP end, it is also possible to make the selection on the terminal MT end and then notify the access point AP of a usable subcarrier. In this case, there would be no need for the terminal to determine which subcarrier carries a signal, thus simplifying the configuration. For notification, a control signal from the terminal MT may be used.

In the conventional TDMA system, if a time slot does not satisfy the required $C/(N+I)$, the communication quality cannot be maintained and the time slot cannot be used.

In contrast, when the radio communication technology according to the present embodiment (in which the OFDM demodulation method is applied in the TDMA method) is applied, individual subcarriers are independent, and even if the mean power is below the predetermined $C/(N+I)$, each subcarrier involves a power variation in accordance with the Rayleigh distribution, as mentioned above, such that there are subcarriers that exceed the predetermined $C/(N+I)$. Thus, such subcarriers can then be detected and used for communications, thereby making communications practically possible.

This process is shown in FIGS. 5(a) to (c), which show the spectra of a desired wave and an interference wave.

As mentioned above, when looked at from the viewpoint of overall power, there is not much difference in electric power between the desired wave and the interference wave such that, when $C/(N+I)$ of the overall power is taken as an indicator, it looks as though communications cannot be performed. However, as shown in FIG. 5(c), when recognized on a subcarrier basis, it can be seen that there are a number of subcarriers in which the desired $C/(N+I)$ can be obtained. Thus, even in a case where time slots have been arbitrarily allocated by an access point AP, there exist regions (fb1 and fb2) in which communications are possible using subcarriers. In accordance with the radio communication technique of the present embodiment, because the influence of interference on the access point AP from other access points AP can be reduced, time slots can be allocated based on the determination only by the access point AP of its own station. Thus, controls in the radio communication system are facilitated.

The access point AP does not require the $C/(N+I)$ information about all of the time slots from the terminal MT. Thus, there is no need for the terminal MT to measure the received power of all of the time slots or the $C/(N+I)$ ratio. As a result, the terminal MT only needs to perform a reception operation in the time slot in its own station without monitoring the all of the time slots, so that the power consumption relating to monitoring purposes can be significantly reduced.

Hereafter, a variation of the radio communication system as described above will be described by referring to the drawings. In this variation, a different method of calculating interference power is used.

In the first embodiment of the invention, the method of detecting interference power involved a calculation of $C/(N+I)$ based on the reception of an individual access point AP signal.

Figure 6:
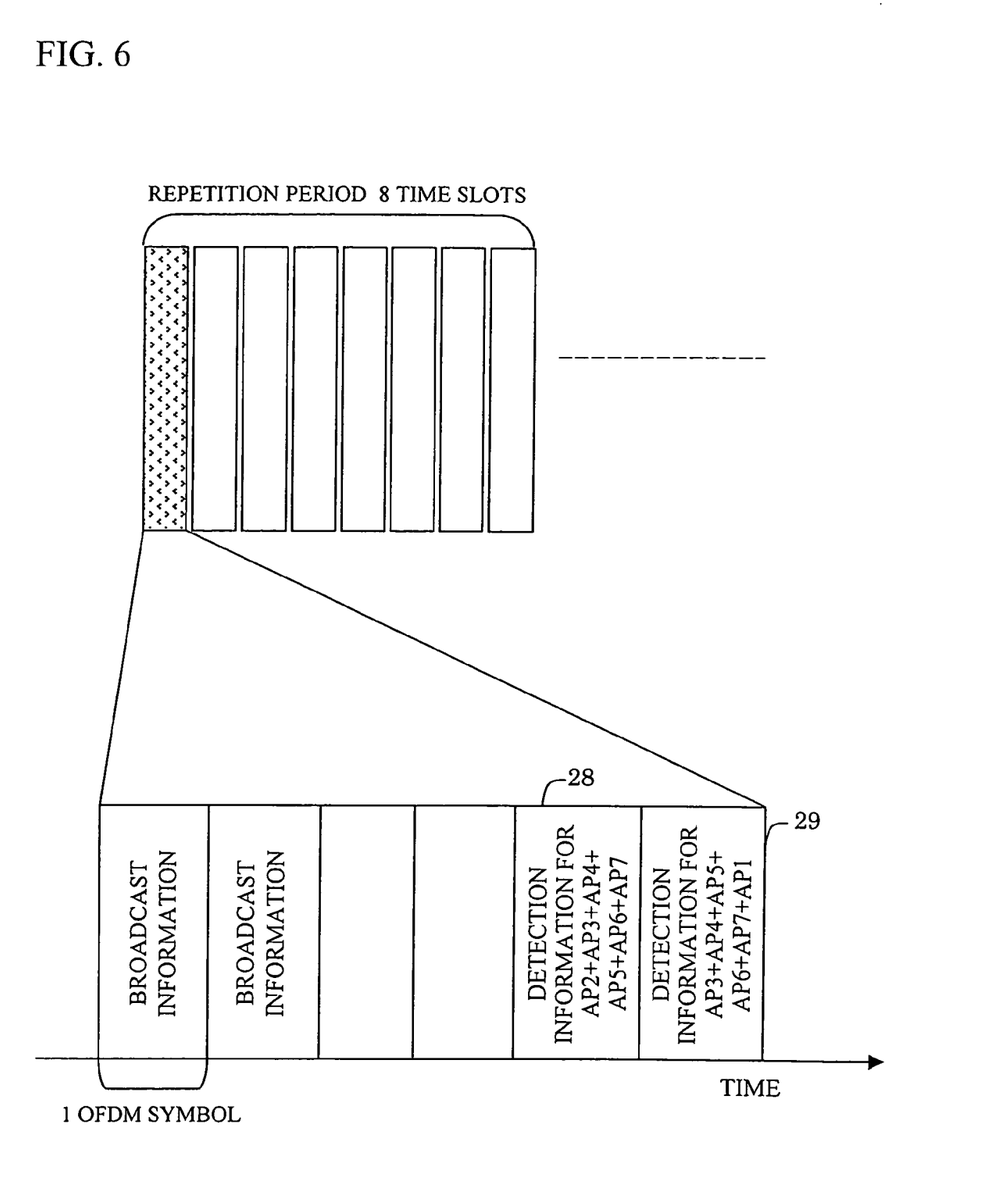
FIG. 6 shows an example of the configuration of a broadcast time slot in a radio communication system according to a variation of the first embodiment of the invention.

The present variation of the first embodiment employs a technique by which a single station does not transmit in a cyclic manner, as described below with reference to FIG. 6.

In the radio communication technique according to the first embodiment, it was necessary to calculate individually for the individual stations because signals were transmitted from the multiple stations individually.

However, in the present variation, a signal composed of signals from stations other than its own station (for example, in a region 28, the sum of the power of the access points other than AP1 such that AP2+AP3+AP4+AP5+AP6+AP7) is transmitted periodically. Thus, $(N+I)$ can be easily calculated by measuring the signals in the region 28. In a region 29, the sum of power except for AP2, i.e., AP1+AP3+AP4+AP5+AP6+AP7, is transmitted. Thereafter, controls are performed in the same manner as in the first embodiment, so that a subcarrier for communications can be also selected in the radio communication system according to the variation.

Hereafter, the radio communication system according to a second embodiment of the invention will be described by referring to the drawings.

The radio communication system of the second embodiment is characterized by a technique relating to the handoff process for the movement of a terminal across cells.

The handoff process is a procedure allowing for a seamless transfer of access points such that the terminal as it moves can be connected to the radio communication system continuously.

Figure 7:
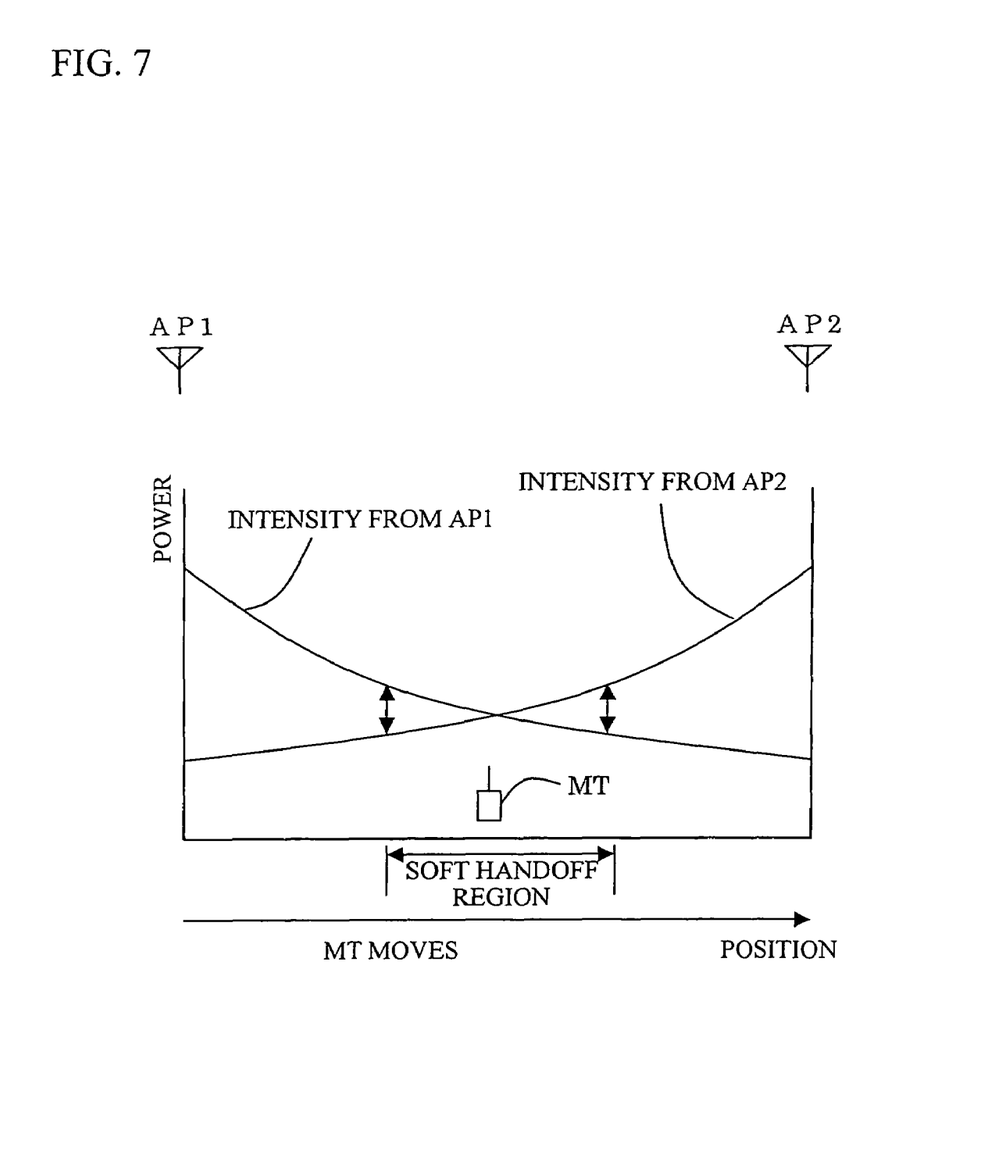
FIG. 7 shows the concept of soft handoff in the radio communication system according to a second embodiment of the invention.

Referring to FIG. 7, in one example of the handoff process, the intensity of radio waves from the two access points AP (AP1 and AP2) are compared in the terminal MT, and then a request is made for a handoff process. In another, an optimum access point AP is selected between the access points AP based on the intensity of the radio wave from the terminal MT, delay time, and so on, and then instructions are made on the part of the radio communication system based on the selection. Generally, a handoff region is located in a boundary between the access points AP. Thus, the difference in the intensity of radio waves between the two access points becomes small in the handoff region.

Referring to FIG. 1, an example will be described in which the radio communication system includes two access points AP1 and AP2 disposed away from each other by a certain distance, and a mobile terminal MT. In this radio communication system, when carrying out a soft handoff process that characterizes the TDMA method, if the power difference between the two access points AP1 and AP2 drops below a certain threshold value, the soft handoff process is initiated. In a soft handoff region illustrated in the figure, the two access points AP1 and AP2 are connected with the terminal MT.

When the original access point is indicated by the sign AP1 and the new access point is indicated by the sign AP2, the time slot that is used prior to the soft handoff region is controlled only within the access point AP1.

In the soft handoff region, however, a time slot must be vacant for both the access points AP1 and AP2. If the time slot is not vacant, any of the following measures can be taken:

(1) Before the terminal MT moves into the soft handoff region, the access point AP2 issues a time slot change instruction to another terminal MT that has been using a time slot of the access point AP2 in order to make the time slot vacant.

(2) Before the terminal MT moves into the soft handoff region, a change instruction is issued to the terminal MT so as to change into a time slot that is commonly vacant for both the access points AP1 and AP2, and then a soft handoff process is initiated.

A common time slot for both access points AP can be secured in either way. As in the case of the first embodiment, there is no need to measure interference from access points AP other than the access points AP1 and AP2 and to search for a vacant slot, and it is only necessary to match between the two access points. Thus, the terminal MT can easily transition into the soft handoff process.

After the control has transitioned into the soft handoff process, the terminal MT measures C/(N+I) as in the cases of the first embodiment of the radio communication system. In the present example, however, since the terminal MT is connected to the two access points (base stations), the terminal MT measures the C/(N+I) information about the two access points AP1 and AP2. Further, the signals from the two access points are classified into three conditions on a subcarrier basis.

Figure 8:
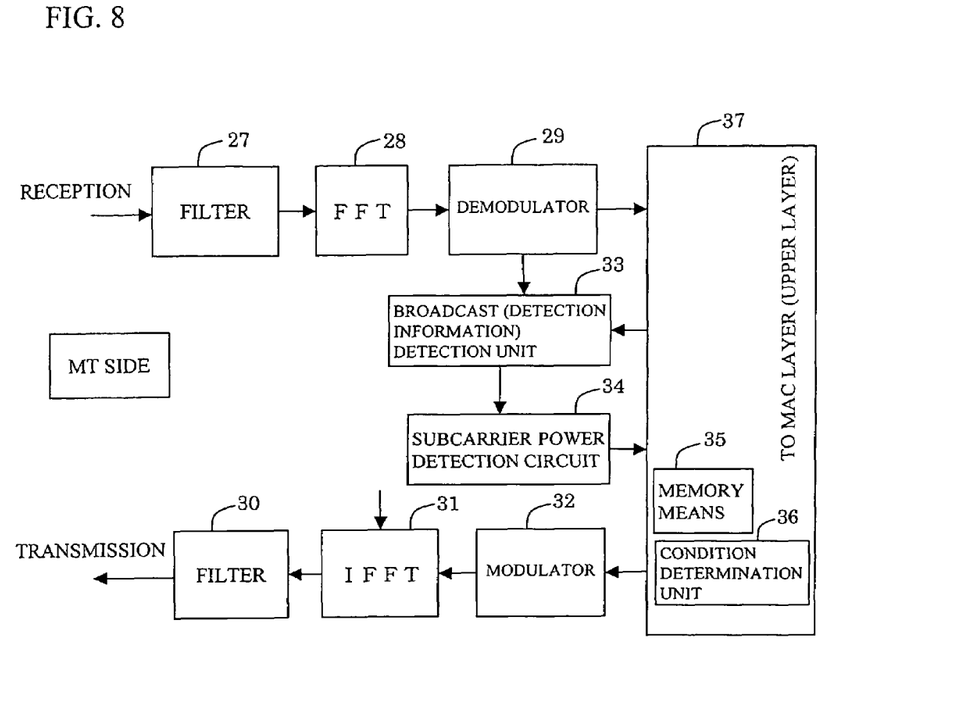
FIG. 8 shows a block diagram of the configuration of a terminal station in the radio communication system according to the second embodiment.

FIG. 8 shows a functional block diagram of an example of the terminal MT that has the aforementioned functions.

The terminal shown in FIG. 8 detects the power of each subcarrier (a detection information detection unit 33, and a subcarrier power detection circuit 34) and stores it (a memory means 35), as does the terminal shown in FIG. 3. In addition, the terminal further classifies the subcarriers according to the following conditions 1 to 3 for the two access points AP1 and AP2.

Condition 1: C/(N+I) of the access point AP1 is larger than C/(N+I) of the access point AP2.

Condition 2: C/(N+I) of the access point AP2 is larger than C/(N+I) of the access point AP1.

Condition 3: C/(N+I) is equal in magnitude for the access points AP1 and AP2.

In the handoff process, if the number of subcarriers with Conditions 1+3 is greater than the number of subcarriers with Condition 2, the control is maintained under the access point (base station A) AP1, while if the number of subcarriers with Conditions 2+3 is larger than the number of subcarriers with Condition 1, the control is transferred to the access point (base station B) AP2.

In an in-between region, the control may be placed under either access point. However, in order to prevent a frequent switching of the control of the terminal MT, the in-between region should preferably be provided with a hysteresis, i.e., it should be placed under the control of the previous access point.

In the conventional handoff procedure, the handoff is based on a total power alone. In the radio communication system according to the present embodiment, however, an importance should preferably be placed on the quality of actual communications and the control should be placed under the access point AP with a better C/(N+I) as a reference for demodulation performance.

In the determination of total power, conventionally, if there was a subcarrier with a very strong power, there was the danger of making a determination based on that subcarrier even if the characteristics of the other subcarriers as a whole were poor. Moreover, in the radio communication system of the first embodiment, since the influence of an interfering wave is large, it is impossible to determine the reliability of data based solely on the intensity of the received power.

In accordance with the radio communication system of the second embodiment of the invention, however, since an access point AP that has more subcarriers with good C/(N+I) is selected without fail, a more accurate handoff process can be performed.

As described above, in accordance with the radio communication system according to the various embodiments of the invention, in a cellular system with a cellular configuration in which connections are made in accordance with the TDMA method with each cell using the same frequency, a control is performed such that communications are carried out using a subcarrier that can be used for communications, so that communications are possible even when there is interference from other stations.

Consequently, there is no need to take into consideration the interference with other cells, and it is possible to arbitrarily allocate time slots to a terminal station under the control of its own station.

Thus, the control is simplified and the need for the monitoring of all of the time slots by the terminal is eliminated, so that the power consumption by the terminal can be reduced.

Further, since the selection of a time slot can be made by the original access point and by the new access point alone, the soft handoff process can be performed easily.

Furthermore, as the relative quality of the two access points AP can be determined on a subcarrier basis, a more accurate handoff can be performed. Thus, an efficient cellular system can be constructed.

While the invention has been described with reference to preferred embodiments thereof, it will be understood by those skilled in the art that the invention is not limited thereto, and it is to be understood that various other changes, improvements and combinations may be made.

INDUSTRIAL APPLICABILITY

In accordance with the radio communication system based on the TDMA method according to the invention, a control is performed such that communications are carried out using a subcarrier that can be used for communications, so that communications are possible even when there is interference from other stations. The need for considering interference with other cells is eliminated, and time slots can be arbitrarily allocated to the terminal stations under the control of its own station.

Thus, the control is simplified, and the need for the monitoring of all of the time slots by the terminal is eliminated, so that the power consumption of the terminal can be reduced.

Moreover, in the handoff process, the selection of a time slot can be performed by the original access point AP and the new access point AP alone, so that the soft handoff process can be performed easily and accurately.

The invention claimed is:

1. A TDMA radio communication system that uses a multiple subcarrier modulation method, comprising:
at least a first and a second radio station, wherein said first radio station carries out communications by selecting and then modulating only a subcarrier with which a desired transfer rate can be obtained in said second radio station, wherein
said second radio station includes:
a power detection unit detecting a received power for each subcarrier and detecting an interference power from another radio station with which said second radio station is communicating; and
a notification unit notifying said first radio station of information regarding said received power and said interference power detected by said power detection unit, and wherein
said first radio station includes:
a subcarrier selection unit selecting, based on a reception state and an interference state of each subcarrier that have been returned from said second radio station, only a subcarrier with which a desired transmission rate can be achieved in said second radio station, wherein only the subcarrier that has been selected by said subcarrier selection unit is selected and modulated for communication.

2. The TDMA radio communication system according to claim 1, wherein said power detection unit comprising an interference power determination unit, a memory unit, and a calculation unit, wherein said first radio station is grouped with other first radio stations that provide interference in a communication area of said first radio station, wherein said interference power determination unit extracts or calculates, upon transmission of a notification signal from each of said grouped first radio stations one by one successively, an interference power state for each subcarrier of said second radio station, wherein the calculated value is stored in said memory unit and wherein said calculation unit calculates a ratio of a desired wave power to an interference power for each subcarrier.

3. The TDMA radio communication system according to claim 1, wherein said power detection unit comprises an interference power measuring unit and a calculation unit, wherein said first radio station is grouped with other first radio stations that provide interference within a communication area of said first radio station, wherein each of said grouped first radio stations transmits a notification signal at the same time, wherein said interference power measuring unit measures, upon termination of the transmission from said first radio stations one by one successively and periodically in a cyclic manner, the interference power of said first radio stations other than said first station with which said second radio station is communicating, for each subcarrier, and wherein said calculation unit calculates a ratio of a desired wave power to an interference power for each subcarrier.

4. A TDMA radio communication system that uses a multiple subcarrier modulation method, comprising at least a first radio station and a second radio station, wherein said first radio station conducts communications by selectively modulating a subcarrier with which a desired transfer rate can be obtained in said second radio station, wherein said second radio station includes:

a power detection unit detecting a received power for each subcarrier from a radio station other than said first radio station with which said second radio station is communicating, for each subcarrier;

a notification unit notifying said first radio station of information regarding said received power detected by said power detection unit; and a subcarrier selection unit selecting, based on the information regarding said received power of each subcarrier that have been returned from said second radio station, only a subcarrier with which a desired transmission rate can be achieved in said second radio station, wherein only the subcarrier that has been selected by said subcarrier selection unit is selected and modulated for communication.

5. A communication method wherein a first communication destination carries out communications by selecting and then modulating only a subcarrier with which a desired transfer rate can be obtained in a second communication destination, wherein the communication method includes the following steps:

detecting a received power for each subcarrier and detecting a interference power from another communication destination with which said second communication destination is communicating;

notifying said first communication destination of information regarding said received power and said interference power detected; and selecting, based on a reception state and an interference state of each subcarrier that have been returned from said second communication destination, only a subcarrier with which a desired transmission rate can be achieved in said second communication destination, wherein only the subcarrier that has been selected is selected and modulated for communication.

* * * * *